US010972525B2

(12) United States Patent
Pruden et al.

(10) Patent No.: US 10,972,525 B2
(45) Date of Patent: Apr. 6, 2021

(54) TARGETED BUFFER PRIORITY MANAGEMENT

(71) Applicant: Comcast Cable Communications, LLC, Philadelphia, PA (US)

(72) Inventors: Benny Pruden, Brownstown, PA (US); Ross Gilson, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 84 days.

(21) Appl. No.: 15/237,317

(22) Filed: Aug. 15, 2016

(65) Prior Publication Data

US 2018/0048691 A1 Feb. 15, 2018

(51) Int. Cl.
*H04L 29/06* (2006.01)
*H04L 12/861* (2013.01)
*H04L 12/851* (2013.01)

(52) U.S. Cl.
CPC ........ *H04L 65/601* (2013.01); *H04L 47/2433* (2013.01); *H04L 65/4092* (2013.01); *H04L 65/80* (2013.01)

(58) Field of Classification Search
CPC ............... H04L 65/601; H04L 47/2433; H04L 65/4092; H04L 65/80
See application file for complete search history.

(56) References Cited

U.S. PATENT DOCUMENTS

| | | | |
|---|---|---|---|
| 4,953,157 A | 8/1990 | Franklin et al. | |
| 6,981,054 B1 | 12/2005 | Krishna | |
| 7,280,471 B2 | 10/2007 | Rajagopal et al. | |
| 2007/0041385 A1* | 2/2007 | Sali | H04L 47/2441 370/395.21 |
| 2008/0285578 A1* | 11/2008 | DeLay | G06F 9/546 370/412 |
| 2009/0059811 A1 | 3/2009 | Wisely et al. | |

(Continued)

FOREIGN PATENT DOCUMENTS

WO    2012159525 A1    11/2012

OTHER PUBLICATIONS

"Understanding How Routing Updates and Layer 2 Control Packets Are Queued on an Interface with a QoS Service Policy," Cisco, (Updated: Feb. 15, 2008), http://www.cisco.com/c/en/us/support/docs/quality-of-service-qos/qos-congestion-management-queueing/18664-rtgupdates.html#backinfo, Retrieved on Nov. 13, 2015.

*Primary Examiner* — Nicholas R Taylor
*Assistant Examiner* — Sanjoy Roy
(74) *Attorney, Agent, or Firm* — Banner & Witcoff, Ltd.

(57) ABSTRACT

In accordance with one or more embodiments, aspects of the disclosure may provide efficient, effective, and convenient ways of managing the transmission of content items in a network. In particular, a device may be preconfigured with buffer priority assignments and performance metrics for various media types or data types. The device may detect a media type or data type for a packet corresponding to a content item, assign the packet to a buffer queue based on the media type or data type, and transmit the packet. The device may also determine whether performance metrics for the media type or data type are being met. If the device fails to meet performance metrics, the device may negotiate with other devices on the network to compensate for the failure to meet performance metrics and/or adjust buffer priorities as necessary.

22 Claims, 8 Drawing Sheets

(56) References Cited

U.S. PATENT DOCUMENTS

| | | | |
|---|---|---|---|
| 2009/0232015 A1 | 9/2009 | Domschitz et al. | |
| 2009/0252148 A1 | 10/2009 | Dolganow et al. | |
| 2010/0232370 A1* | 9/2010 | Jing | H04L 69/22 370/329 |
| 2010/0232396 A1* | 9/2010 | Jing | H04L 47/14 370/336 |
| 2011/0026408 A1* | 2/2011 | Skarve | H04L 1/1812 370/242 |
| 2015/0089014 A1* | 3/2015 | Niemeijer | H04L 67/06 709/213 |
| 2015/0127843 A1* | 5/2015 | Karaoguz | H04L 45/00 709/228 |
| 2015/0319211 A1* | 11/2015 | Edelman | H04L 47/10 709/219 |

* cited by examiner

TARGETED BUFFER PRIORITY MANAGEMENT

BACKGROUND

Increasing use of electronic devices has led to increased demands on network infrastructure. These demands often outstrip the infrastructure, impacting performance to the consumer. As network-enabled devices continue to grow in popularity and people continue to use them for an ever-growing number of reasons, administrators of these devices have demanded and will continue to demand better systems and methods for optimizing networks.

SUMMARY

Aspects of the disclosure generally relate to computing hardware and computer software. In particular, one or more aspects of the disclosure relate to computing hardware and computer software for managing network performance by assigning content items to a buffer queue according to media type or data type.

Some environments may present difficulties for network traffic. For example, a congested network may introduce delays in packet transmissions and/or drop packets. This may introduce undesirable network conditions, including latency and/or jitter that may affect usability. By providing a system for managing buffer queue priorities, a system can reduce the effects of latency and/or jitter on targeted media types or data types that are more susceptible to such unfavorable network conditions. The system may determine that content corresponding to a media type or data type has been requested, such as by determining a file extension for the content, and may manage one or more buffer priorities for downstream devices in order to help optimize network conditions.

In accordance with one or more embodiments, aspects of the disclosure may provide efficient, effective, and convenient ways of managing the transmission of content items in a network. In particular, a device may be preconfigured with buffer priority assignments and performance metrics for various media types or data types. The device may detect a media type or data type for a packet corresponding to a content item, assign the packet to a buffer queue based on the media type or data type, and transmit the packet. The device may also determine whether performance metrics for the media type or data type are being met. If the device fails to meet performance metrics, the device may negotiate with other devices on the network to compensate for the failure to meet performance metrics and/or adjust buffer priorities as necessary.

This summary is not intended to identify critical or essential features of the disclosure, but merely to summarize certain features and variations thereof. Other details and features will be described in the sections that follow.

BRIEF DESCRIPTION OF THE DRAWINGS

Some features herein are illustrated by way of example, and not by way of limitation, in the figures of the accompanying drawings, in which like reference numerals refer to similar elements, and in which.

DETAILED DESCRIPTION

According to some aspects described herein, systems and methods may manage network performance by assigning packets to a buffer priority queue for transmission by devices across a network. A device upstream of a gateway may prioritize traffic by sending prioritization settings (e.g., prioritizing gaming data, video data, etc.) to downstream devices (e.g., backhaul routers, gateway devices, client devices, etc.). In many instances, routing devices prioritize packets for transmission by assigning the packets to one of a number of buffer queues, which then buffer received packets for output. Packets in the highest priority buffer queues may be transmitted before packets in the lower priority buffer queues. For example, all packets in a highest priority buffer queue may be transmitted before any packets in a lower priority buffer queue may be allowed to be transmitted. In another example, a device may transmit multiple packets in a higher priority buffer queue for every packet in a lower priority buffer queue. Further, if packets are received faster than they can be transmitted, buffer queues may fill up. If buffer queues fill up, packets may be dropped from the lowest priority buffer queues. By assigning media types or data types to various priorities of buffer queues, a system may effectively manage network performance for the media types or data types. For example, by assigning streaming audio transmissions to a high priority buffer queue, the system may reduce packet loss and transmission delays introduced by devices along a route that forward packets comprising a streaming audio transmission.

Figure 1:
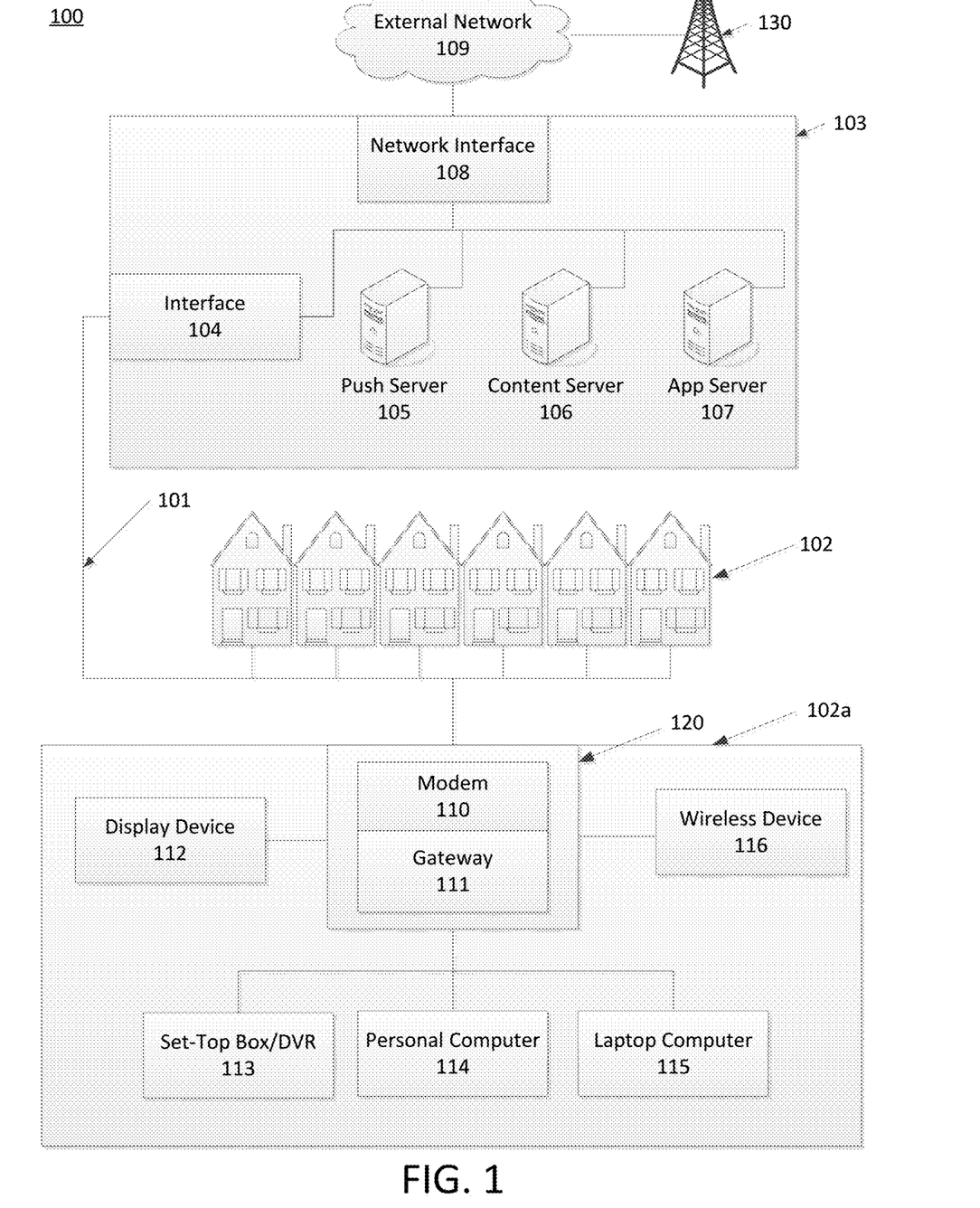
FIG. 1 depicts an illustrative network environment.

FIG. 1 illustrates an example information distribution network in which one or more of the various features described herein may be implemented. The illustrated information distribution network is only one example of a network and is not intended to suggest any limitation as to the scope of use or functionality of the disclosure. The illustrated network should not be interpreted as having any dependency or requirement relating to any component or combination of components in an information distribution network.

A network 100 may be a telecommunications network, a Multi-Service Operator (MSO) network, a cable television (CATV) network, a cellular network, a wireless network, an optical fiber network, a coaxial cable network, a Hybrid Fiber-Coaxial (HFC) network, or any other type of information distribution network or combination of networks. For example, the network 100 may be a cellular broadband network communicating with multiple communications access points, such as a wireless communications tower 130. In another example, the network 100 may be a coaxial system comprising a Cable Modem Termination System (CMTS) communicating with numerous gateway interface devices (e.g., a gateway 111 in an example home 102a). In another example, the network 100 may be a fiber-optic system comprising optical fibers extending from an Optical Line Terminal (OLT) to numerous Optical Network Terminals (ONTs) communicatively coupled with various gateway interface devices. In another example, the network 100 may be a Digital Subscriber Line (DSL) system that includes a local office 103 communicating with numerous gateway interface devices. In another example, the network 100 may be an HFC network in which Internet traffic is routed over both optical and coaxial communication paths to a gateway interface device in or near a user's home. Various aspects of the disclosure may operate on one or more of the networks described herein, or any other network architectures now known or later developed.

The network 100 may use a series of interconnected communication links 101 (e.g., coaxial cables, optical fibers, wireless links, etc.) to connect a premises 102 (e.g., a home or other user environment) to the local office 103. The communication links 101 may include any wired communication links, wireless communication links, communications networks, or combinations thereof. For example, portions of the communication links 101 may be implemented with fiber-optic cable, while other portions of the communication links 101 may be implemented with coaxial cable. The communication links 101 may also include various communications components such as splitters, filters, amplifiers, wireless components, switches, routers, and other components for communicating data.

The local office 103 may include an interface 104, which may be a computing device configured to manage communications between devices on the network of the communication links 101 and backend devices, such as a server. For example, the interface 104 may be a CMTS. The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in the premises 102, and to receive upstream communications from those modems on one or more upstream frequencies.

The local office 103 may include one or more network interfaces 108 for communicating with one or more external networks 109. The local office 103 may include a variety of servers that may be configured to perform various functions. The local office 103 may include a push server 105 for generating push notifications to deliver data, instructions, or both to devices that are configured to detect such notifications. The local office 103 may include a content server 106 configured to provide content (e.g., media content) to devices. The local office 103 may also include an application server 107.

The gateway 111 may be any computing device for communicating with the modem 110 to allow one or more other devices in the example home 102a to communicate with the local office 103, the one or more external networks 109, and/or other devices communicatively coupled thereto. The gateway 111 may include local network interfaces to provide communication signals to client devices in or near the example home 102a, such as a television 112, a set-top box 113, a personal computer 114, a laptop computer 115, a wireless device 116 (e.g., a wireless laptop, a tablet computer, a mobile phone, a portable gaming device a vehicular computing system, a mobile computing system, a navigation system, an entertainment system in an automobile, marine vessel, aircraft, etc.), or any other device. In some instances, the gateway 111 may be a wireless hotspot, which may be configured to provide service to one household and/or other users.

Figure 2:
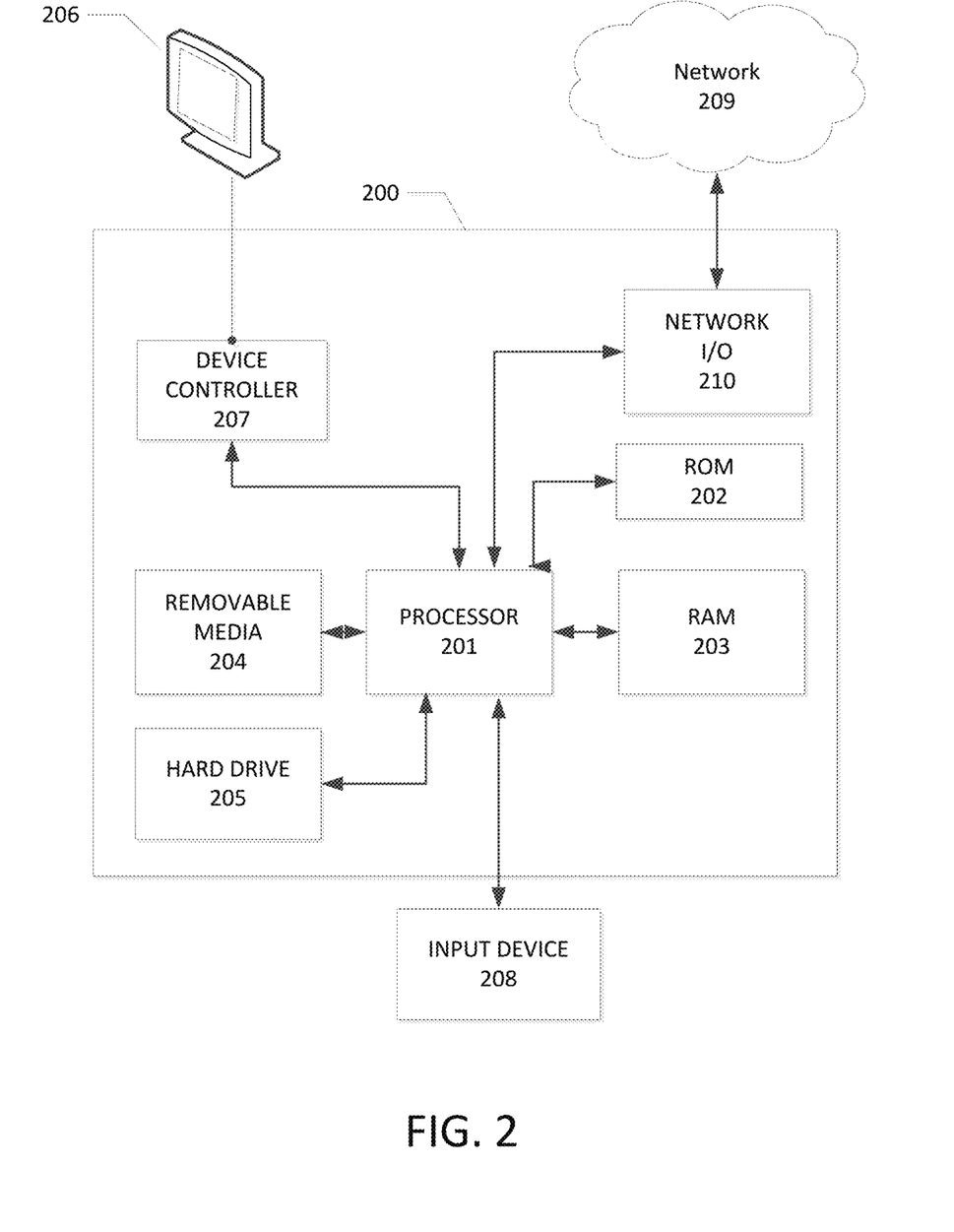
FIG. 2 depicts an illustrative software and hardware device.

FIG. 2 illustrates general hardware elements and software elements that can be used to implement any of the various computing devices, servers, encoders, caches, and/or software discussed herein. A device 200 may include a processor 201, which may execute instructions of a computer program to perform any of the functions and steps described herein. The instructions may be stored in any type of computer-readable medium or memory to configure the operation of the processor 201. For example, instructions may be stored in a Read-Only Memory (ROM) 202, a Random Access Memory (RAM) 203, a removable media 204, such as a Universal Serial Bus (USB) drive, Compact Disk (CD) or Digital Versatile Disk (DVD), hard drive, floppy disk, and/or any other desired electronic storage medium. Instructions may also be stored in a hard drive 205, which may be an internal or external hard drive.

The device 200 may include one or more output devices, such as a display 206 (e.g., an integrated or external display, monitor, and/or television), and may include a device controller 207, such as a video processor. In some embodiments, the device 200 may include an input device 208, such as a remote control, keyboard, mouse, touch screen, microphone, motion sensing input device, and/or any other input device.

The device 200 may also include one or more network interfaces, such as a network Input/Output (I/O) interface 210 to communicate with a network 209. The network interface may be a wired interface, wireless interface, or a combination of the two. In some embodiments, the network I/O interface 210 may include a cable modem, and the network 209 may include the communication links 101 shown in FIG. 1, the one or more external networks 109, an in-home network, a provider's wireless, coaxial, fiber, or hybrid fiber/coaxial distribution system (e.g., a DOC SIS network), and/or any other desired network.

Figure 3:
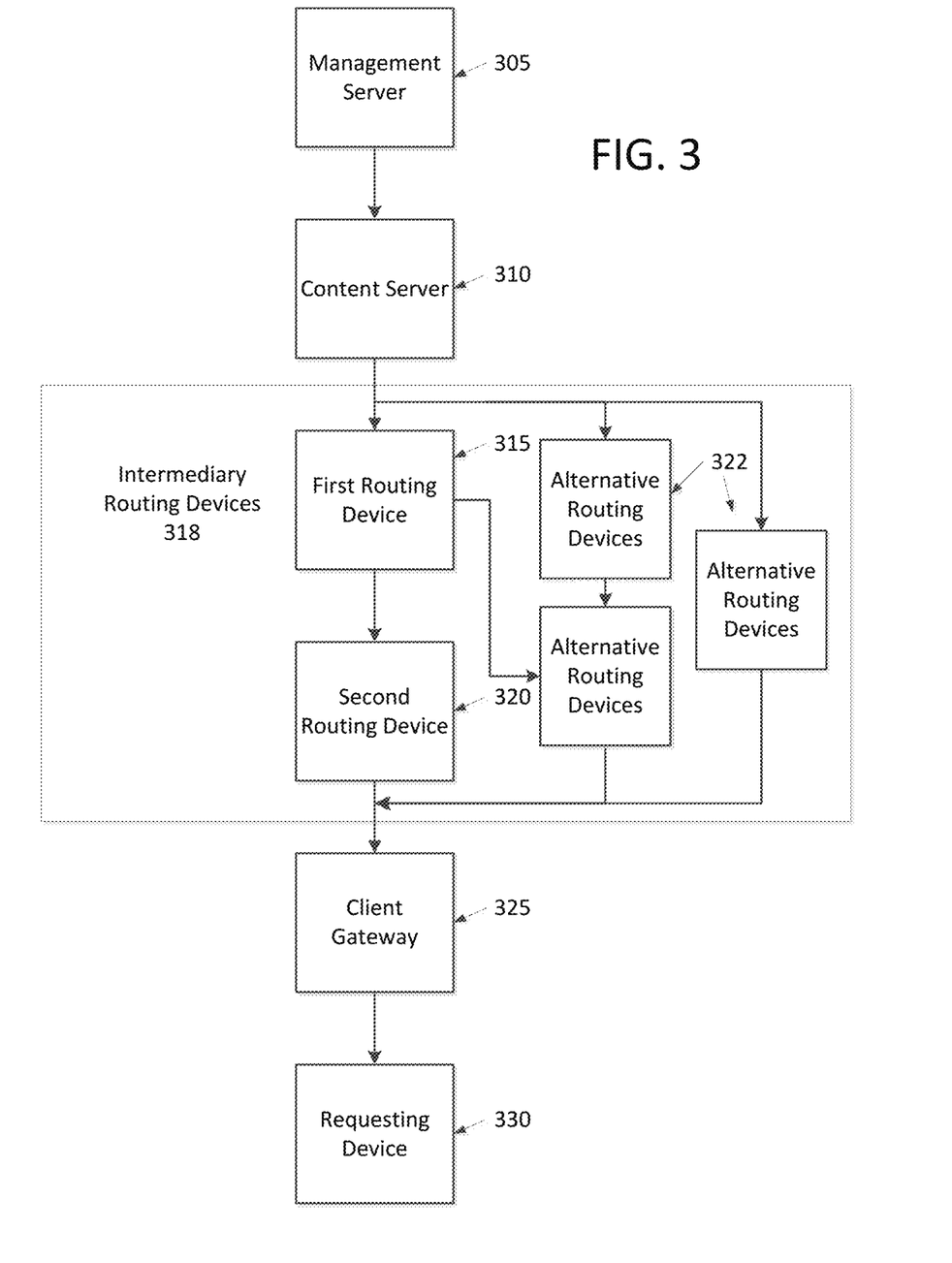
FIG. 3 depicts an example device arrangement in a network.

FIG. 3 illustrates an example device arrangement in a network upon which one or more methods described herein may operate. A management server 305 may comprise a computing device 200 which may be configured to manage downstream devices. For example, a management server 305 may be a load balancing server that analyzes and instructs downstream routing devices in order to effectively manage bandwidth. In some instances, the management server 305 may determine which content server 310 will service a request for a content item on a given route to a requesting device 330. The management server 305 may receive a request to transmit a content item to the requesting device 330. For example, a user on a requesting device 330 (e.g., a computer, set-top box, mobile device, etc.) may trigger a request for a content item (e.g., a movie, web page, song, data file, multiplayer gaming data, etc.) from a content server 310 and/or a management server 305. In some instances, after receiving the request, the management server 305 may select a content server 310 and/or a route through devices 310-330 in order to efficiently deliver the content item. In other instances, a content server 310 may respond to the request directly. The management server 305 may reside in the local office 103, and/or on the external network 109. Though FIG. 3 depicts an example device arrangement, numerous variations may be possible. For example, a management server 305 may sit downstream from the content server 310, and/or additional routing devices may exist between a management server 305 and a content server 310.

A content server 310 may hold content items for delivery to a requesting device 330. In some instances, the content server 310 may store a copy of content delivery on demand. There may also be multiple content servers 310 in the network, each storing copies so that multiple requests for the same and/or differing content may be serviced faster. The content server 310 may receive a request for a content item. The content server 310, in response to the request and/or an instruction from the management server 305, may then transmit the content item to the requesting device 330 via the devices 315-325. In some instances, the content server 310 may receive the request for the content item from the requesting device 330 and pass the request on to the management server 305 for the management server 305 to manage the delivery of the content item. The content server 310 may be a content server 106, or may reside on the external network 109.

A first routing device 315 may be an intermediary routing device between the content server 310 and the requesting device 330. In some instances, additional intermediary routing devices, such as a second routing device 320, may be downstream (i.e., closer to the requesting device 330). The intermediary routing devices, collectively, are referred to herein as intermediary routing devices 318. The intermediary routing devices may receive a content item at one device (such as from the content server 310 and at the first routing device 315), pass the content item along internally (such as from the first routing device 315 and to the second routing device 320), and then pass the content item on to the requesting device 330 (such as from the second routing device 320 and to the client gateway 325). The routing devices that comprise the intermediary routing devices 318 may be programmed according to one or more methods described herein, either independently or collectively. In some instances, each routing device of the intermediary routing devices 318 may receive individual instructions. In other instances, a single set of instructions may be given for a plurality of routing devices in the intermediary routing devices 318. The intermediary routing devices may exist on the external network 109, in the local office 103, and/or along the communication links 101.

The client gateway 325 may bridge a local network with a larger provider-operated network. In some instances, the client gateway 325 may be a gateway 111 and/or an interface 103. The client gateway may receive a request from a requesting device 330 and submit the request, using an external network connection, to a content server 310 or a management server 305. In some instances, the client gateway 325 may pass the request along intermediary routing devices 318. The client gateway 325 may also receive the content item from the external network and deliver it to the requesting device 330. In some embodiments, there may be no client gateway 325, and the requesting device 330 may interface directly with the external network. In other embodiments, the client gateway 325 may contained in or may be attached to the requesting device 330.

The requesting device 330 may be a device that initiates a request for a content item. The requesting device 330 may be a computing device 200. The requesting device 330 may be a laptop computer, desktop computer, set top box, entertainment console, tablet, mobile device, server, workstation, and/or any device that may request content items from an upstream server. The requesting device 330 may initiate a request for a content item automatically or in response to input from a user. After initiating the request, the requesting device 330 may receive the requested content item from the content server 310.

Figure 4:
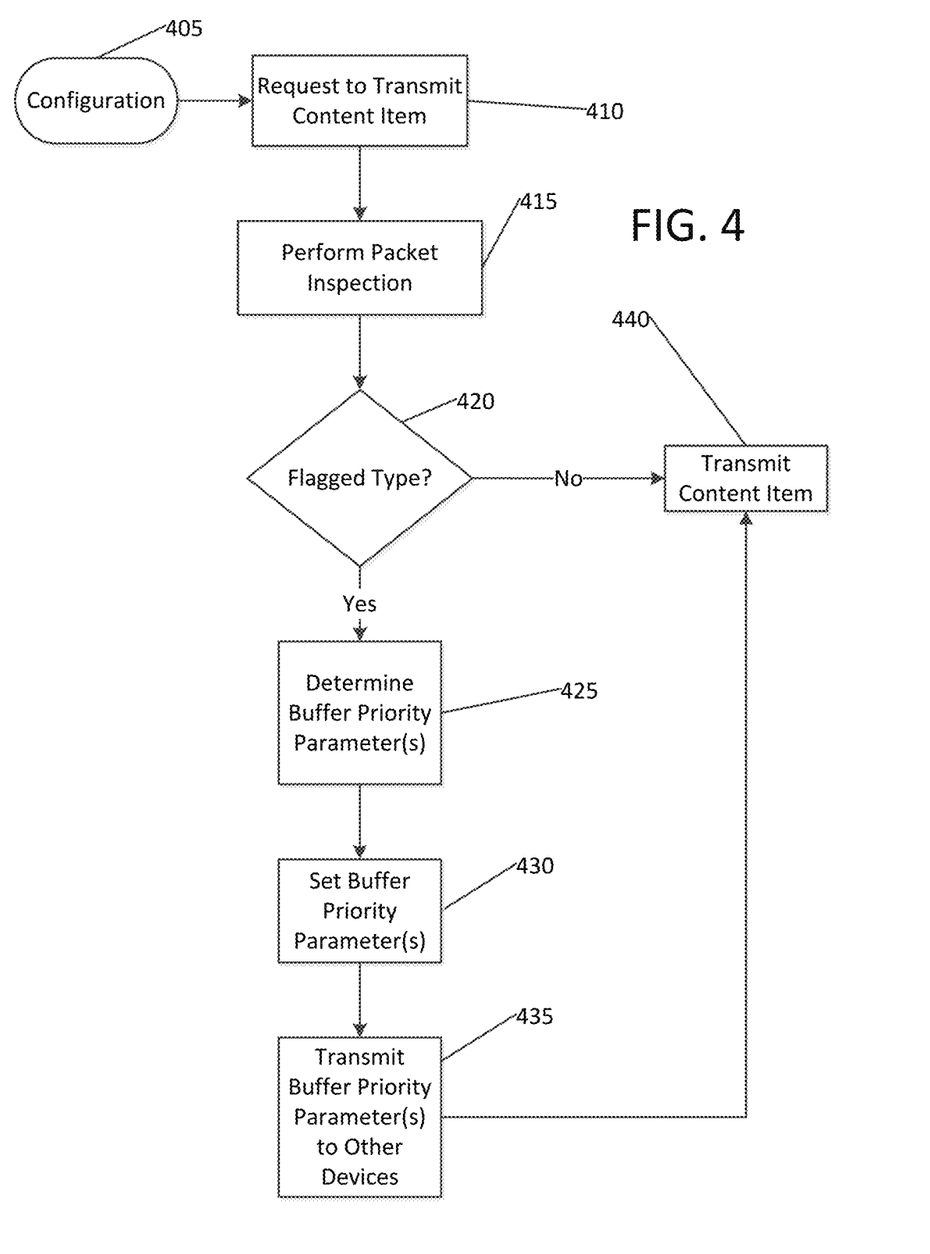
FIG. 4 depicts an exemplary method for establishing buffer priority parameters for a content item across a system.

FIG. 4 illustrates an exemplary method for establishing buffer priority parameters for a content item across a system. In some embodiments, the system may be a subset of a network, such as a subset of the network depicted in FIG. 3. In some instances, the system may be a management server 305, content server 310, and/or client gateway 325.

At step 405, the system may be configured to operate the method disclosed herein. In some instances, the system may be pre-programmed with priorities for various media types or data types. For example, an administrator may program the system to give a high priority to media types or data types that use real-time play-back (e.g., multiplayer gaming information and/or a VoIP transmission that may require minimal latency for an acceptable user experience), a medium priority to media types or data types that use buffered playback (e.g., a streaming music transmission that may tolerate some latency without impacting the user experience), and a low priority to media types or data types that are downloaded in full prior to access (e.g., a file download where latency may have minimal impact). This may have the advantage of maximizing user experiences and/or minimizing disruptions caused by jitter and/or latency in the transmission of the content item.

At step 410, in some instances, the system may receive a request to transmit a content item. The request may be a packet from a downstream requesting device 330 requesting that the system supply a content item from a storage location (e.g., digital storage connected to a content server 310). For example, the system may receive a data packet requesting that a video file be delivered to a network address corresponding to the requesting device 330. In another example, a client gateway 325 may receive a request for a content item from a requesting device 330.

At step 415, the system may perform a packet inspection of the content item to determine the media type or data type of the content item that is and/or will be transmitted. The system may review packets corresponding to the content item to determine a media type or data type based on a file extension associated with the content item. For example, a management server 305 and/or content server 310 may determine that the content item is a audiovisual file based on a file extension associated with a video file format, such as a Moving Picture Experts Group (MPEG) format file (e.g., .mpg, .mpeg, mp4, etc.). In another example, the system may determine that a content item is an audio file based on a file extension associated with an audio format (e.g., .wav, .avi, .mp3, etc.). The system may also recognize file extensions associated with other file formats, such as picture and/or graphical file formats, voice over IP (VoIP) file formats, executable file formats (e.g., .exe, .msi), compressed file formats (e.g., .zip), work file formats (.doc, .ppt, etc.), web page file formats (e.g., .html), file formats associated with online gaming, or any other file format.

In some instances, the system may identify the media type or data type for a content item based on other means. The system may determine a media type or data type for a file based on a port. For example, a system may determine that a content item that is directed to transmission control protocol (TCP)/user datagram protocol (UDP) port 3108 should be identified as multiplayer data for an online game. The system may determine a media type or data type for a content item based on an identifier in the file. For example, the system may determine that a content item contains an application ID associated with VoIP. The system may determine a media type or data type for a content item based on performing a deep packet inspection of the content item and comparing one or more packets of the content item to expected contents for various media types or data types. For example, the system may determine that a content item is a text file based on the content item comprising textual data consistent with a text file.

The system may also determine the media type or data type of a content item based on transmission characteristics associated with the content item. For example, a high definition video stream may have a bandwidth that is usually between 8 MB/s and 12 MB/s. If the system detects a content item being transmitted with a bandwidth in that range, it may determine that the content item is a high definition video stream. The size or frequency of packets may also be used to determine a media type or data type. For example, VoIP data may continuously draw a smaller amount of bandwidth than a video file, such as 500 KB/s, and may exhibit a high packet frequency which may not fill each packet to its maximum size. The system may determine that a continuous stream of data for a content item with those characteristics is a VoIP data stream. The system may make such determinations even if it may be inaccurate in a particular instance. For example, the system may categorize a low-quality video stream as a VoIP data stream because they have similar bandwidths. This may have the advantage of allowing more efficient bandwidth management in the aggregate, even if it may not be accurate in every instance. In some instances, a stream may be re-categorized as more of the stream is analyzed. For example, initially a stream may be mischaracterized as a VoIP stream, only to be correctly categorized as a low bitrate video stream seconds later due to an increase in bitrate to a bitrate beyond what would be seen in a VoIP stream. Further, any method or combination of methods for determining a media type or data type (such as one or more disclosed herein) may be utilized.

In some instances, the system may determine a media type or data type for a content item without performing a deep packet inspection. For example, the system may be a content server 310 which is serving the content item. The content server 310 may contain a database of the media types or data types of the content items stored in its connected storage, and it may identify the media type or data type based on the database.

At step 420, the system may determine if the media type or data type of the content item conforms to a flagged type. The system may consult a database to determine if the media type or data type of the content item matches a media type or data type flagged in the database for priority treatment (i.e., a buffer priority should be assigned for the content item). For example, the system may determine that the content item comprises streaming video, review the database for how to handle streaming video, and determine that streaming video should receive higher priority based on a database entry. In another example, the system may determine that the content item comprises a text file, review the database for how to handle text files, and determine that text files should not receive any priority treatment based on a database entry. In some instances, a lack of an entry may indicate that no priority treatment should be taken. If no priority treatment should be taken, the system may transmit the content item without taking further action as in step 440. If priority treatment should be taken, the system may proceed to step 425.

At step 425, the system may determine a buffer priority parameter for the content item. The system may consult a database to determine a buffer priority parameter that corresponds to the media type or data type of the content item. A buffer priority parameter may indicate the level of the buffer queue to which packets corresponding to the content item should be assigned. For example, a buffer priority parameter of 1 may indicate that the content item should be assigned to the highest priority queue in the intermediary routing devices 318. In another example, a buffer priority parameter of 4 may indicate that the content item should be assigned to the lowest priority queue in the intermediary routing devices 318. Any number or arrangement of buffer queues may be possible. In some instances, a buffer priority parameter may provide more general instructions on which intermediary routing devices 318 may act. For example, a buffer priority parameter may comprise data indicating that a packet corresponds to a video file and should be given elevated priority. The intermediary routing devices 318 may read the data and determine how best to act based on routing conditions local to the intermediary routing devices and/or databases indicating buffer priorities for various media types or data types. The intermediary routing devices 318 may then assign packets corresponding to the content item to a buffer queue based on the determined buffer priority.

At step 430, the system may set the buffer priority parameter. An upstream device, such as a management server 305 or content server 310, may instantiate prioritization settings for downstream devices by setting a buffer priority for the content item based on the buffer priority parameter determined in step 425. This buffer priority will be used by the system for transmissions regarding the content item. For example, if the system determines that a content item comprising a VoIP transmission requires the highest buffer priority, the system may assign packets corresponding to the content item to the highest available buffer queue for later transmission.

In step 435, the system may transmit one or more buffer priority parameters to other devices on the network. The system may embed data indicating the buffer priority parameter in packets corresponding to the content item. In some instances, a previously unused header field in packets corresponding to the content item may be used to store the buffer priority parameter. For example, packet headers may be appended with a field that indicates the media type or data type and/or buffer priority to be used. In other instances, existing, known quality of service methods may be utilized to indicate the buffer priority. For example, a type of service (ToS) field, source/destination addresses, and/or port numbers in an IP header may be utilized to indicate the buffer queue that should be used for the content item.

In some embodiments, buffer priority instructions may be sent separately from packets that make up the content item. A message and/or set of instructions may be passed by the system to the intermediary routing devices 318 and/or client gateway 325 along a route informing the devices of the buffer priority parameter(s) that are associated with the content item. After the message has been sent and/or received, the content item may then be transmitted along the route. For example, a management server 305 may send a set of instructions may be passed along a route in a message instructing the devices along the route to set a VoIP transmission to a high buffer priority. The devices may all make adjustments according to the instructions and/or one or more methods described herein. After the instructions have been sent and adjustments made, the management server 305 may then instruct a content server 310 to send the content item along the route.

At step 440, the system may transmit the content item to the requesting device 330. If it was determined not to use priority treatment in step 420, the system may transmit the content item using known methods. If the content item was flagged for priority treatment in step 420, the system may transmit the content item using the buffer queues that are appropriate for the content item as determined in step 425.

Figure 5:
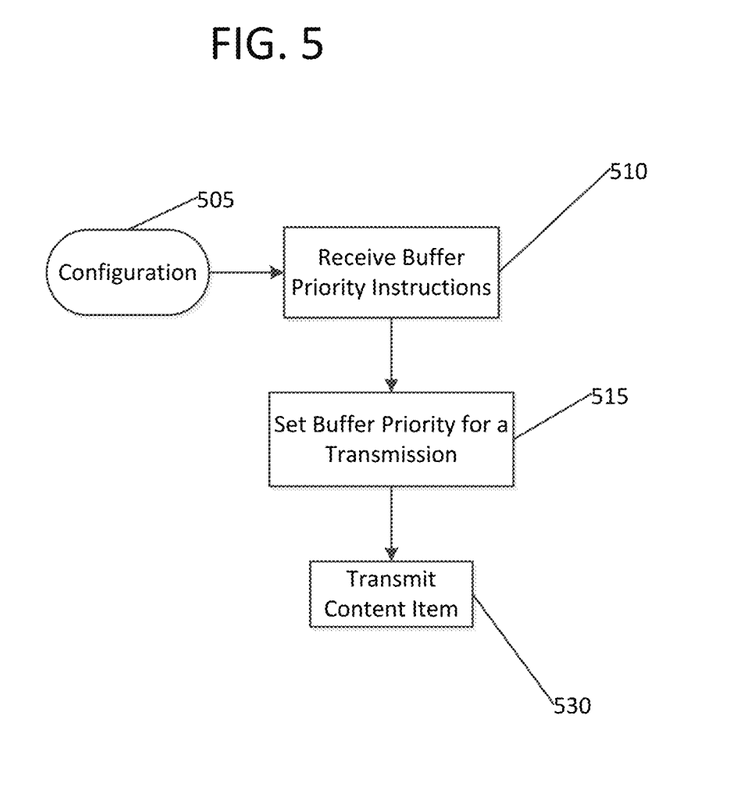
FIG. 5 depicts an exemplary method for receiving and/or acting upon buffer priority instructions.

FIG. 5 illustrates an exemplary method for receiving and/or acting upon buffer priority instructions received according to one or more methods described herein.

At step 505, a device, such as an intermediary routing device 318 or a client gateway 325, may be configured to act upon buffer priority instructions. The device may be pre-configured to map an assigned buffer priority to a buffer queue of the device. For example, the system may be programmed to match a buffer priority of 1 to the highest priority buffer queue of the device. In some instances, the device may not match the buffer priorities 1-to-1 to buffer priority queues. For example, in one embodiment, buffer priority parameters may vary from 1 to 8, but a device may only have 4 buffer queues. The device may then map buffer priorities 1 and 2 to the highest buffer queue, map buffer priorities 3 and 4 to the second highest buffer queue, map buffer priorities 5 and 6 to the third highest buffer queue, and map buffer priorities 7 and 8 to the lowest priority buffer queue.

At step 510, the device may receive buffer priority instructions. In some instances, the device may detect the presence of buffer priority instructions in a packet header of a packet comprising some portion of a content item. For example, the device may detect a buffer priority parameter in a header of the content item that was added according to step 435 above. In some instances, the device may receive buffer priority instructions separately from packets comprising the content item. For example, the device may receive a packet with a buffer priority parameter that provides instructions as to how the device should treat forthcoming packets comprising the content item.

At step 515, the device may set a buffer priority for transmission of the content item. The device may examine the instructions received in step 510 to determine the buffer priority queue to which the content item should be assigned. The device may then assign incoming packets to the assigned buffer queue as they are received by the device.

At step 530, the device may transmit the content item. The device may transmit the content item using the queue assigned in step 515.

Figure 6:
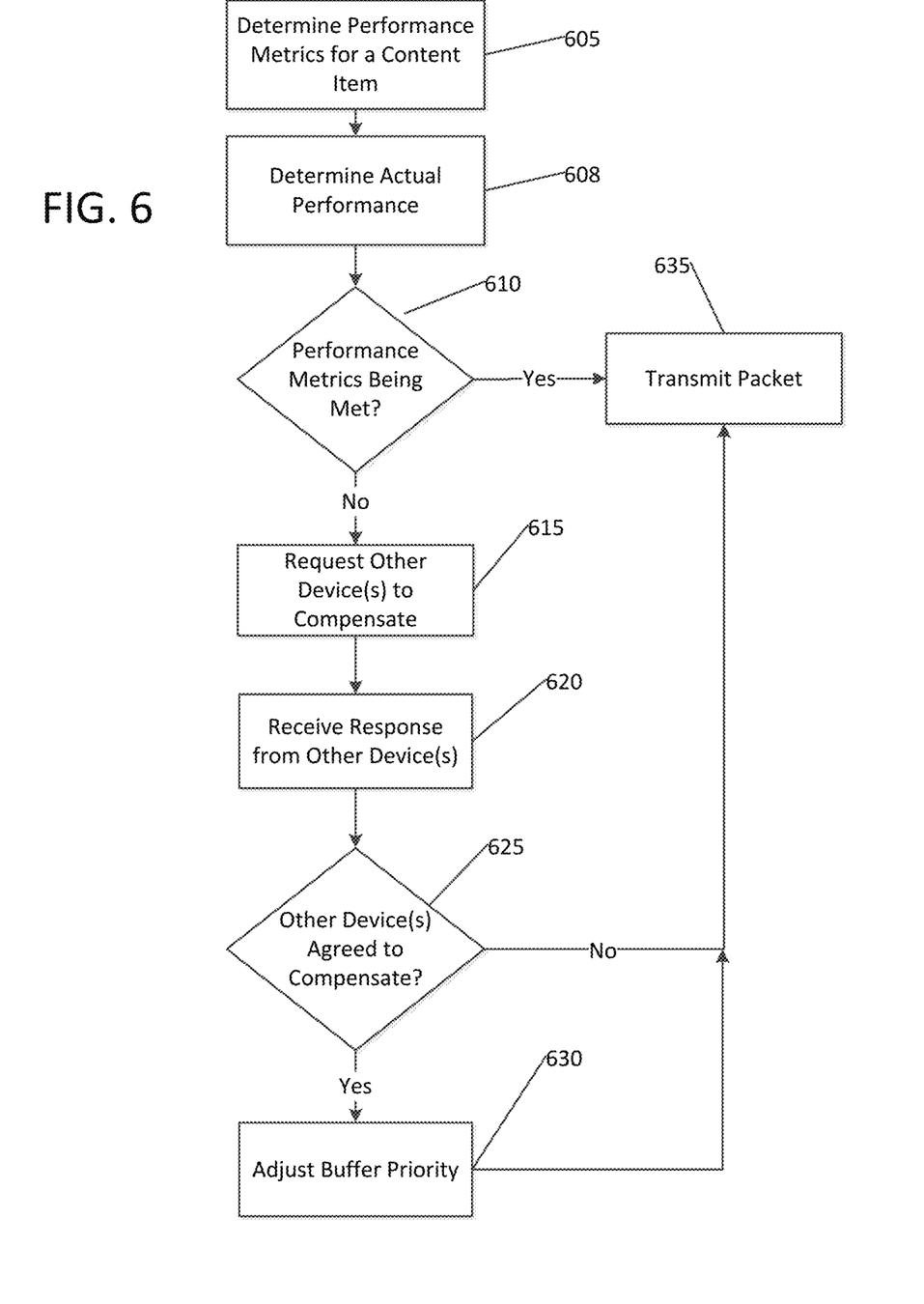
FIG. 6 depicts an exemplary method for dynamically adjusting buffer priority queues for a content item based on network conditions.

FIG. 6 illustrates an exemplary method for dynamically adjusting buffer priority queues for a content item based on network conditions. In many instances, one device on a network may fail to meet performance metrics. For example, heavy bandwidth on a second routing device 320 may cause the second routing device 320 to have undesired latency and/or packet loss. Since latency and packet loss are cumulative, another routing device with lower latency and/or packet loss can reduce the overall latency and/or packet loss that accumulates over the duration of the route. If the second routing device detects that it is not meeting performance metrics, it may then request a first routing device 115 to adjust performance metrics in order to compensate. If the first routing device 115 compensates, the average latency and/or packet loss across the route may meet performance metrics even though the second routing device 320 may fail to meet the performance metrics.

At step 605, a device may determine performance metrics for a content item. The device may be a management server 305, a content server 310, a client gateway 325, and/or any other such network device. The device may determine a media type or data type and/or buffer priority for a device using one or more methods described herein, such as is depicted in FIGS. 5 and 6. Periodically, the device may determine a time-to-transmission value for the device. In some instances, time-to-transmission values may be calculated for one or more buffer queues of the device. The buffer priority queue may be the assigned buffer priority queue for the media type or data type on the device. For example, streaming audio may be assigned to the second highest buffer priority queue. The time-to-transmission value may indicate the delay between the device receiving a packet for the content item and transmitting the packet for the content item. Latency may be measured using time-to-transmission values or other such values. For example, streaming audio may have a 0.5 millisecond time-to-transmission value, which indicates that streaming audio should have, at most, a 0.5 millisecond delay between receipt and transmission. The device may determine a packet-loss value based on the media type or data type of the content item. For example, work file types (which may use an ACK in transmission and/or may not be time-sensitive) may have a packet-loss value of 0.05%. The device may also determine any other performance metric values as may be appropriate. For example, performance metrics may comprise bandwidth, latency, jitter, and/or other networking performance characteristics.

At step 608, the device may determine actual performance. In some instances, the device may examine performance metrics for one or more individual transmissions. The device may track the time-to-transmission values and/or packet-loss values for transmissions of content items flagged for priority treatment according to one or more methods described herein. For example, a device may determine that a streaming video transmission has a time-to-transmission value of 0.1 milliseconds and a packet-loss value of 0.02%, and that a buffering video transmission has a time-to-transmission value of 0.3 milliseconds and a packet-loss value of 0.04%. In other instances, the device may determine performance metrics on a per-buffer basis. The device may track the time-to-transmission values and/or packet-loss values for transmissions in each buffer queue. For example, the device may determine that packets assigned to the highest priority buffer queue have a time-to-transmission value of 0.1 milliseconds and a packet-loss value of 0.04%, while transmissions assigned to the second highest priority buffer queue have a time-to-transmission value of 0.7 milliseconds and a packet-loss value of 0.03%. In yet other instances, the device may determine average performance metrics. For example, the device may track all packets as they are received and transmitted, and determine the average time-to-transmission values and/or packet-loss values for all transmissions. For example, the device may determine that the average packet in a 10 second window has a time-to-transmission value of 0.3 milliseconds and a packet-loss value of 0.06%.

At step 610, the device may determine if performance metrics are being met within a threshold. In some instances, the device may determine if actual performance metrics for a given media type or data type, buffer queue, or otherwise are within a threshold of the performance metric values determined in step 605. For example, the device may determine in step 605 that streaming audio has a 0.5 millisecond time-to-transmission value and a packet-loss value of 0.05%. The device may determine that streaming audio is assigned to the second highest buffer priority queue in step 605. In step 608, the device may determine that the second highest buffer priority queue has a time-to-transmission value of 0.1 milliseconds and a packet-loss value of 0.04%. The device may then compare the actual results against the metrics. For example, the device may determine that the actual transmission value and the packet-loss value are 115% of the metric values. The system may have a threshold of 130%, and anything under 130% may be acceptable. Thus, in this example, the performance metrics may be met. In another example, the device may determine that the actual transmission value and the packet-loss value are 150% of the metric values. If the system has a threshold of 140%, the system may then determine that performance metrics are not being met. If performance metrics are within the threshold, the device may proceed to transmit additional packets at 635. If performance metrics are not being met, the device may request one or more other devices on the network to compensate at step 615.

At step 615, the device may request one or more other devices on the network to compensate for the failure of the device to meet the performance metrics for one or more content items. In some instances, the device may transmit a message to the other devices along one or more routes requesting that those devices compensate for the device. For example, a first routing device 315 may transmit a message to a second routing device 320 requesting that the second routing device 320 adjust its buffer priorities to compensate for the first routing device 315. In another example, the first routing device 315 may transmit a message to other devices upstream and/or downstream requesting other devices to adjust their buffer priorities. In other instances, the device may append an instruction to packets transmitted downstream requesting other devices to compensate for the failure of the device to meet performance metrics. For example, a first routing device 315 may begin receiving VoIP packets to be forwarded downstream. The first routing device 315 may determine that it may meet performance metrics for the VoIP packets, as discussed above in step 610. The first routing device 315 may then append an instruction to the VoIP packets that requests downstream devices, such as a routing device 320, use more stringent performance metrics in order to compensate for the first routing device 315 failing to meet its performance metrics. In other instances, the first routing device 315 may compensate for a failure to meet performance metrics by modifying received instructions regarding buffer priorities before transmitting buffer priorities downstream. For example, a first routing device 315 may receive a packet comprising instructions that the first routing device 315 should assign a buffered video stream to its third highest priority buffer queue. However, the first routing device 315 may determine, as described above, that items assigned to the third highest priority buffer queue in the device may fail to meet performance metrics. In response, the first routing device 315 may modify the instructions to state that routing devices should assign the buffered video stream to their second highest priority buffer queue before forwarding instructions on to other devices. This may cause the second routing device 320 to assign the buffered video stream to its second highest priority buffer queue, which may mitigate poor performance by the first routing device 315. After requesting other devices to compensate, the device may wait a predetermined period of time to receive responses at step 620. In some instance, the device may not wait for a response and proceed to adjusting buffer priorities. For example, if the device modified received instructions, such as discussed above, the device may not expect a response, and may proceed to step 630.

Other methods may also be used in accordance with the methods described herein to compensate for the failure of the device to meet the performance metrics. For example, parametrized quality of service ("PQoS") may be utilized. The device may send a PQoS request to the one or more other devices, instructing the one or more other devices to set one or more parameters for a content stream such as a minimum bandwidth, set packet size, and/or other parameters. In some instances, a request may have the one or more other devices send a limited amount of a content item at an elevated priority or quality of service before returning to normal service. For example, one of the one or more other devices may agree to compensate by sending video traffic at an elevated priority for five minutes. This may have the advantage of helping alleviate a temporary failure of the device to meet metrics without creating a long-term strain on the network.

Further, the one or more other devices may create a new instance of one or more methods described herein as a result of attempting to meet a request. The one or more other devices may agree to compensate for a failure, which may in turn cause the one or more other devices to also fail to meet performance metrics. Then, the one or more other devices may in turn request other devices to compensate, instantiating new iterations of a method. Thus, a request for compensation for a performance failure may effectively ripple across many devices in a network, with multiple devices agreeing to compensate. For example, a request for a compensation of 30 ms of latency by a first device may be agreed to by a second which only has the capability of reducing 10 ms of latency. The second device may then request a compensation of 20 ms from a third device (and so on). In some instances, this may cause a header (such as a header for a content item) requesting performance compensation to be continually modified so as to reduce an amount of requested compensation until no compensation is required and/or no further devices are available to compensate.

At step 620, the device may receive one or more responses from the one or more other devices that the device had messaged in step 615. As the other devices receive a request to adjust their buffer priorities, the other devices may determine if they are outperforming their own performance metrics. For example, other intermediate routing device 318, content servers 310, or client gateways 325 may determine if they are exceeding expected performance sufficient to implement stricter metrics. If they are exceeding their internal performance metrics by a predetermined threshold, they may adjust their buffer priorities and/or performance metrics. For example, in response to a request from a first routing device 315, a second routing device 320 may assign buffered video to a second highest priority queue rather than a third highest priority queue and/or enact more rigorous performance metrics for buffered video content. This may help to compensate for a failure of the first routing device 315 to meet performance metrics, and may help to ensure expected performance is maintained over a route. The other devices may then transmit responses to the device, indicating that they adjusted buffer priorities and/or did not comply with the request. The device may then receive the responses.

At step 625, the device may determine whether the other devices have agreed to compensate for the failure of the device to meet performance metrics. If an insufficient number of affirmative responses have been received to compensate for the device, the device may determine that performance metrics cannot be presently met, and continue to transmit packets in step 635. This may result in a continued failure of the network to meet performance expectations. If one or more of the other devices have agreed to compensate, the device may adjust buffer priorities in step 630.

At Step 630, the device may adjust its buffer priorities. If other devices are compensating for the device, the device may reduce its buffer priorities and/or performance metrics. For example, the device may reassign a buffer video stream from a third highest priority buffer queue to a fourth highest priority buffer queue, increase the acceptable time-to-live value by 25%, and increase the permitted packet-loss ration by 25%. This may allow the device to adjust its buffer priorities and accompanying performance metrics so that performance metrics for the device continue to be met, while the impact on overall performance for the network is mitigated due to the compensation by the other devices. After adjusting buffer priorities, the device may proceed to transmit additional packets at step 635.

At step 635, the device may transmit additional packets. The additional packets may be one or more portions of one or more content items being received and/or forwarded by the device. The transmitted packets may be inserted into an assigned buffer queue for transmittal, according to one or more methods described herein. In some embodiments, the transmission of packets may normally be continuous, but may be interrupted if a failure to meet performance metrics is detected (such as in step 610).

Figure 7:
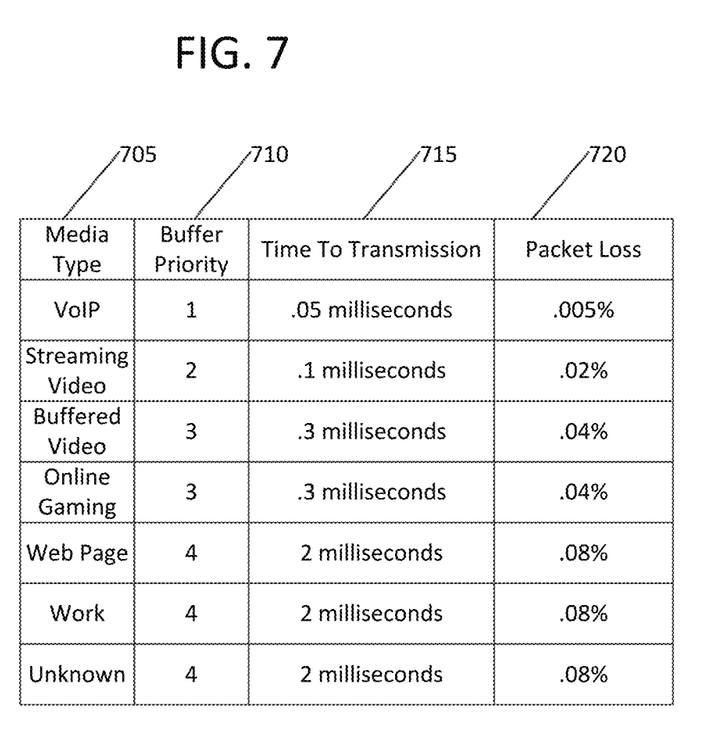
FIG. 7 depicts an illustrative example of a database of buffer priorities and performance metrics for various media types or data types.

FIG. 7 depicts an illustrative example of a database of buffer priorities and performance metrics for various media types or data types. A database stored in a management server 305, a content server 310, an intermediary routing device 318, a client gateway 325, and/or a requesting device 330 may associate assigned buffer priorities 710 and expected performance metrics (e.g., time-to-transmission values 715 and packet-loss values 720) for a media type or data type 705. Media types or data types 705 may correspond to VoIP data, streaming video data, buffered video data, online gaming data, web page data, work file data, data types unknown to the system, and/or any other type of data that may correspond to content items transmitted over a network. Each media type or data type may be assigned a buffer priority 710. The buffer priority 710 may indicate the optimal buffer queue for the media type or data type. Each media type or data type may also have corresponding performance metrics, such as a time-to-transmission value 715 and a packet-loss value 720. These metrics may indicate the expected and/or acceptable operating parameters for a content item matching a media type or data type and/or buffer priority.

Figure 8:
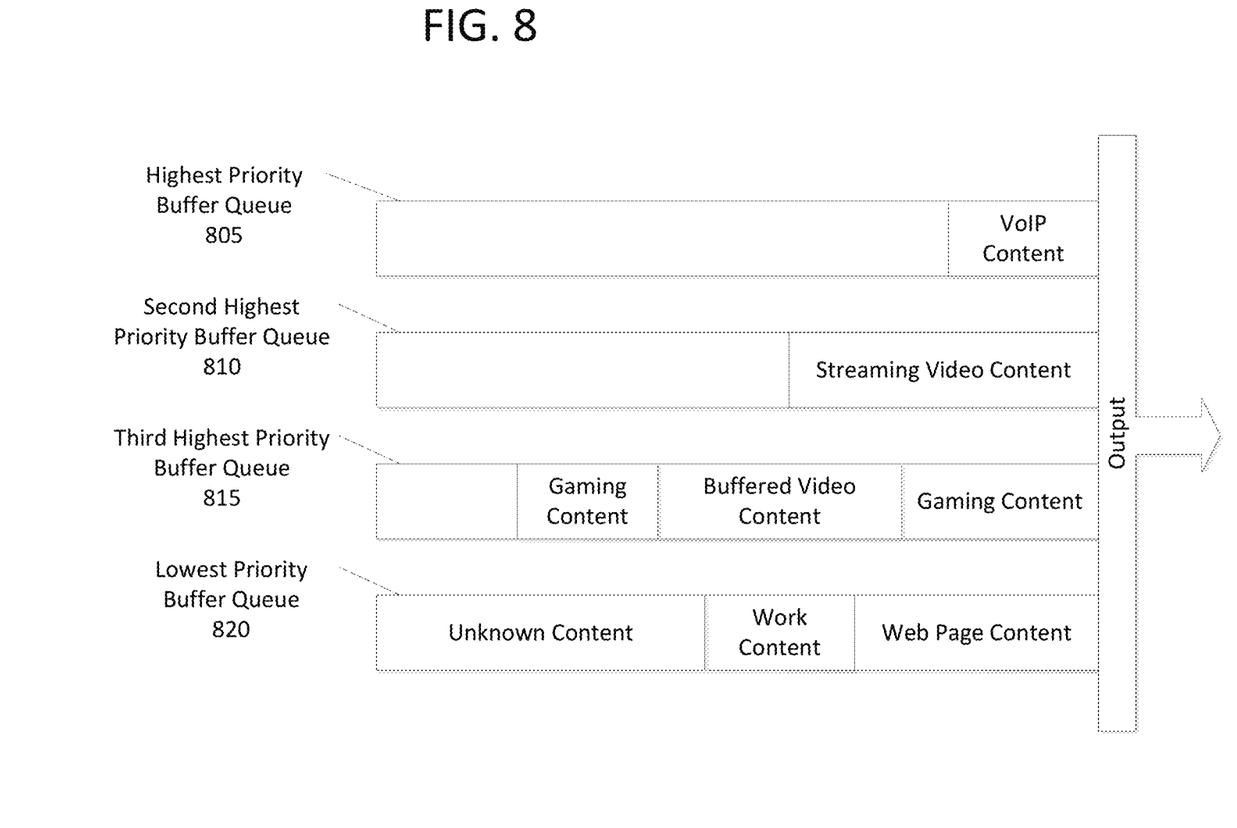
FIG. 8 depicts an illustrative example of priority buffer queues for a device. A device may have any number of buffer queues with different priorities.

FIG. 8 depicts an illustrative example of priority buffer queues for a device. A device may have any number of buffer queues with different priorities. For example, a device may have four buffer queues, with each queue assigned a priority from highest to lowest. Serviced packets may be packets that are output for processing by a processor, output for transmission, or otherwise used and/or acted upon by the device. Packets in each buffer priority queue may be serviced such that the packets that have been in each queue the longest are serviced before other packets in that queue. After an item in a buffer queue is serviced, the next item in that buffer queue may be serviced. For example, after transmitting a block of gaming content in a third highest priority buffer queue 815, the device may transmit buffered video content that was inserted into the queue after the gaming content. Once the buffered video content has been transmitted, the device may transmit further gaming content that was inserted after the buffered video content.

In some embodiments, the device may only service a limited number of buffer queues at a time, and may service packets in a higher priority buffer queue before packets in a lower priority buffer queue. For example, VoIP packets in a highest priority buffer queue 805 may be transmitted before any lower priority buffer queues are serviced. When a given priority buffer queue is empty, packets from the next highest priority buffer queue may be serviced. For example, once the highest priority buffer queue 805 is empty, streaming video packets in the second highest priority buffer queue 810 may be transmitted. In other embodiments, some other algorithm may determine the order of service. For example, the device may iteratively transmit four VoIP packets from the highest priority buffer queue 805, three streaming video packets from the second highest priority buffer queue 810, two gaming packets from the third highest priority buffer queue 815, and one web page packet from the lowest priority buffer queue 820. This may have the advantage of servicing packets in a higher priority buffer queue earlier than packets placed in a lower priority buffer queue, which may result in lower latency for packets corresponding to high priority content items.

If a buffer queue fills up, new items assigned to that queue may be placed, instead, in the next lower buffer queue. For example, if the highest priority buffer queue is full, an item assigned to the highest priority buffer queue may be placed in the second highest priority buffer queue. If the lowest priority buffer queue is full, items assigned to that queue may be discarded. This may have the advantage of reducing packet loss for packets corresponding to high priority content items.

The methods and features recited herein may be implemented through any number of computer readable media that are able to store computer readable instructions. Examples of computer readable media that may be used include RAM, ROM, Electrically Erasable Programmable Read-Only Memory (EEPROM), flash memory or other memory technology, CD-ROM, DVD, or other optical disk storage, magnetic cassettes, magnetic tape, magnetic storage, and the like.

Additionally or alternatively, in at least some embodiments, the methods and features recited herein may be implemented through one or more Integrated Circuits (ICs). An IC may, for example, be a microprocessor that accesses programming instructions or other data stored in a ROM. In some embodiments, a ROM may store program instructions that cause an IC to perform operations according to one or more of the methods described herein. In some embodiments, one or more of the methods described herein may be hardwired into an IC. For example, an IC may comprise an Application Specific Integrated Circuit (ASIC) having gates and/or other logic dedicated to the calculations and other operations described herein. In still other embodiments, an IC may perform some operations based on execution of programming instructions read from ROM or RAM, with other operations hardwired into gates or other logic. Further, an IC may be configured to output image data to a display buffer.

Although specific examples of carrying out the disclosure have been described, those skilled in the art will appreciate that there are numerous variations and permutations of the above-described apparatuses and methods that are contained within the spirit and scope of the disclosure as set forth in the appended claims. Additionally, numerous other embodiments, modifications, and variations within the scope and spirit of the appended claims may occur to persons of ordinary skill in the art from a review of this disclosure. Specifically, one or more of the features described herein may be combined with any or all of the other features described herein.

The various features described above are merely non-limiting examples, and may be rearranged, combined, subdivided, omitted, and/or altered in any desired manner. For example, features of the servers may be subdivided among multiple processors and/or computing devices. As another example, advancements in the art may produce additional media types or data types with new characteristics (e.g., virtual reality streams with far higher bandwidth requirements than seen today) upon which the methods described herein may operate. The true scope of this patent should only be defined by the claims that follow.

What is claimed is:

1. A method comprising:
receiving, by a computing device and from a user device, a request for a content item;
determining, by the computing device and based on a media type associated with the content item, a buffer priority parameter associated with the content item;
determining, by the computing device and from a plurality of routes of a network, a route comprising a plurality of routing devices;
sending, by the computing device and after receiving the request for the content item, messages to the plurality of routing devices, wherein the messages instruct the plurality of routing devices to use the buffer priority parameter in routing future packets associated with the content item; and
sending, by the computing device, to the user device, via the route comprising the plurality of routing devices, and after sending the messages, the content item.

2. The method of claim 1, wherein the determining the buffer priority parameter comprises:
determining, by the computing device, based on the media type, and for the content item, a buffer level in the plurality of routing devices.

3. The method of claim 1, wherein the determining the buffer priority parameter further comprises determining, based on at least one performance metric associated with the request for the content item, the buffer priority parameter.

4. The method of claim 1, wherein the determining the buffer priority parameter comprises:
determining, by the computing device, a file type extension for the content item; and
determining, by the computing device and based on the file type extension, the media type.

5. The method of claim 1, wherein the messages further instruct the plurality of routing devices to use buffer levels associated with the buffer priority parameter to route the future packets.

6. The method of claim 1, wherein the determining the buffer priority parameter comprises:
determining, based on the media type, a prioritization level of the content item.

7. A method comprising:
determining, by a computing device, a buffer priority for a media type;
determining, by the computing device, that a content item requested by a user device corresponds to the media type;
determining, by the computing device and for sending the content item to the user device, a plurality of routing devices;
sending, by the computing device, to the plurality of routing devices, and after the user device requested the content item, a first packet comprising instructions for preparing the plurality of routing devices to prioritize, based on the buffer priority and in a buffer queue, a second packet associated with the content item; and
sending, by the computing device, to the user device, and via a route comprising the plurality of routing devices, the second packet.

8. The method of claim 7, further comprising determining different buffer priorities for a plurality of different media types.

9. The method of claim 7, wherein the buffer priority is associated with at least one performance metric associated with the content item.

10. The method of claim 7, wherein the determining the buffer priority for the media type comprises:
determining, by the computing device and based on a file type extension for the content item, the media type; and
determining, by the computing device and based on the media type, the buffer priority.

11. The method of claim 7, wherein the buffer priority is associated with a minimum delay between:
each of the plurality of routing devices receiving the second packet; and
the each of the plurality of routing devices sending the second packet to other routing devices of the plurality of routing devices or the user device.

12. The method of claim 7, wherein the buffer priority is associated with a maximum allowed packet loss rate at each of the plurality of routing devices.

13. The method of claim 7, wherein the determining the buffer priority further comprises determining, based on a transport protocol associated with the second packet, the buffer priority.

14. The method of claim 7, wherein the buffer queue is a buffer queue comprising a plurality of buffers, and wherein a plurality of priorities are associated with the plurality of buffers.

15. A method comprising:
sending, by a computing device, to at least one user device via a plurality of routing devices, and according to a buffer priority for a media type, one or more packets corresponding to the media type;
determining, by the computing device, a failure to meet a performance metric for the sending of the one or more packets, wherein the performance metric is associated with the buffer priority;
detecting, by the computing device, one or more additional packets corresponding to the media type;
causing, by the computing device, at least one of the plurality of routing devices to adjust the buffer priority for the one or more additional packets; and
after causing the adjusting of the buffer priority, sending, by the computing device, to the at least one user device and via the plurality of routing devices, the one or more additional packets.

16. The method of claim 15, wherein the causing the at least one of the plurality of routing devices to adjust the buffer priority comprises causing the at least one of the plurality of routing devices to adjust, based on the failure, at least one additional performance metric associated with the sending of the one or more additional packets.

17. The method of claim 15, further comprising:
receiving, by the computing device and from the at least one of the plurality of routing devices, at least one positive response to the adjusting of the buffer priority; and
causing, by the computing device and based on the at least one positive response, another one of the plurality of routing devices to adjust the buffer priority.

18. The method of claim 15, further comprising:
adjusting, by the computing device and based on the failure, the buffer priority of the media type.

19. The method of claim 15, wherein the failure to meet a performance metric comprises a failure to satisfy a minimum delay between receiving the one or more packets and sending the one or more packets to at least one of the plurality of routing devices.

20. The method of claim 15, wherein the failure to meet a performance metric comprises a failure to satisfy a minimum allowed packet loss rate.

21. The method of claim 1, wherein the sending the messages comprises sending the messages to the plurality of routing devices prior to sending any future packets associated with the content item.

22. The method of claim 15, wherein the causing the at least one of the plurality of routing devices to adjust the buffer priority comprises sending, by the computing device, an instruction to adjust the buffer priority.

* * * * *

UNITED STATES PATENT AND TRADEMARK OFFICE
CERTIFICATE OF CORRECTION

| | |
|---|---|
| PATENT NO. | : 10,972,525 B2 |
| APPLICATION NO. | : 15/237317 |
| DATED | : April 6, 2021 |
| INVENTOR(S) | : Pruden et al. |

It is certified that error appears in the above-identified patent and that said Letters Patent is hereby corrected as shown below:

In the Specification

Column 4, Detailed Description, Line 36:
Delete "DOC SIS" and insert --DOCSIS-- therefor Column 9, Detailed Description, Line 53:
Delete "115" and insert --315-- therefor Column 9, Detailed Description, Line 55:
Delete "115" and insert --315-- therefor Column 12, Detailed Description, Line 63:
Delete "Step" and insert --step-- therefor Signed and Sealed this
Twenty-ninth Day of August, 2023

Katherine Kelly Vidal
*Director of the United States Patent and Trademark Office*